US010567195B2

(12) United States Patent
Murray

(10) Patent No.: US 10,567,195 B2
(45) Date of Patent: Feb. 18, 2020

(54) NETWORK NODES IN A RING NETWORK

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/763,772

(22) PCT Filed: Sep. 30, 2015

(86) PCT No.: PCT/US2015/053082
§ 371 (c)(1),
(2) Date: Mar. 27, 2018

(87) PCT Pub. No.: WO2017/058183
PCT Pub. Date: Apr. 6, 2017

(65) Prior Publication Data
US 2018/0270083 A1 Sep. 20, 2018

(51) Int. Cl.
*H04L 12/437* (2006.01)
*H04L 12/24* (2006.01)
*H04L 29/14* (2006.01)
*H04L 12/701* (2013.01)
*H04L 12/26* (2006.01)

(52) U.S. Cl.
CPC ........ *H04L 12/437* (2013.01); *H04L 41/0654* (2013.01); *H04L 41/12* (2013.01); *H04L 45/00* (2013.01); *H04L 69/40* (2013.01); *H04L 41/0672* (2013.01); *H04L 43/0811* (2013.01)

(58) Field of Classification Search
CPC .............. H04L 12/437; H04L 41/0654; H04L 41/0672; H04L 41/12; H04L 43/0811; H04L 45/00; H04L 69/40
See application file for complete search history.

(56) References Cited

U.S. PATENT DOCUMENTS 5,179,548 A * 1/1993 Sandesara ............... H04J 3/085
370/222
6,052,210 A * 4/2000 Nathan ................ H04B 10/032
398/1

(Continued)

OTHER PUBLICATIONS

International Searching Authority, The International Search Report and the Written Opinion, dated Jul. 8, 2016, PCT/US2015/053082, 14 Pgs.

(Continued)

*Primary Examiner* — Khaled M Kassim
*Assistant Examiner* — Kai Chang
(74) *Attorney, Agent, or Firm* — Hewlett Packard Enterprise Patent Department

(57) ABSTRACT

According to an example method, it is determined that a first network node in a ring network is claimed by a first managing device and a second network node in the ring network is claimed by a second managing device. The ring network includes a single link to a customer network. The second network node is then isolated from the first network node. A separate linear network is formed including the second network node. Upon reset of the second network node to an unclaimed status, the second network node is claimed by the first managing device.

20 Claims, 7 Drawing Sheets

(56) References Cited

U.S. PATENT DOCUMENTS

| | | | |
|---|---|---|---|
| 6,480,473 B1* | 11/2002 | Chambers | H04L 41/00 370/253 |
| 6,731,597 B1* | 5/2004 | Batchellor | H04J 14/0227 370/223 |
| 8,004,966 B2 | 8/2011 | Koch et al. | |
| 8,355,348 B1* | 1/2013 | Miller | H04L 12/462 370/256 |
| 8,718,053 B2 | 5/2014 | Wang | |
| 9,258,195 B1* | 2/2016 | Pendleton | H04L 41/12 |
| 9,871,708 B2* | 1/2018 | Vinod | H04L 43/0811 |
| 2007/0165518 A1* | 7/2007 | Bruckman | H04L 12/437 370/222 |
| 2008/0101219 A1 | 5/2008 | Rose et al. | |
| 2008/0137530 A1 | 6/2008 | Fallis et al. | |
| 2009/0052317 A1* | 2/2009 | Takagi | H04L 41/0654 370/223 |
| 2009/0268609 A1* | 10/2009 | Koch | H04L 12/423 370/222 |
| 2010/0165883 A1* | 7/2010 | Holness | H04L 45/28 370/255 |
| 2010/0278078 A1 | 11/2010 | Proulx et al. | |
| 2010/0287405 A1* | 11/2010 | Soon | H04L 43/0811 714/4.1 |
| 2010/0309928 A1* | 12/2010 | Saha | H04L 12/1895 370/412 |
| 2011/0075554 A1* | 3/2011 | Holness | H04L 1/22 370/228 |
| 2011/0317555 A1 | 12/2011 | Kleineberg et al. | |
| 2013/0064069 A1* | 3/2013 | Huang | H04L 12/437 370/222 |
| 2013/0170359 A1* | 7/2013 | Ino | H04L 43/0817 370/241 |
| 2013/0250753 A1* | 9/2013 | Shin | H04L 12/437 370/222 |
| 2014/0115190 A1 | 4/2014 | Przybylski | |
| 2014/0301185 A1* | 10/2014 | Chen | H04L 12/437 370/225 |
| 2015/0117860 A1* | 4/2015 | Braun | H04J 14/0282 398/58 |
| 2016/0352624 A1* | 12/2016 | Mishra | H04L 45/28 |
| 2018/0152318 A1* | 5/2018 | Murray | H04L 12/42 |

OTHER PUBLICATIONS

Wang, G. "Study on PLC with Switch Management in Intelligent Manufacturing Network", Jun. 1, 2014, 23 Pgs.

* cited by examiner

NETWORK NODES IN A RING NETWORK

BACKGROUND

In a datacenter, network modules (e.g., Ethernet switches, Virtual Connect fabrics, etc.) may be linked to enhance connectivity and redundancy. Network modules may be linked in a variety of topologies according to various network protocols.

One popular example of a protocol commonly used for layer-2 networks is the spanning tree protocol or the rapid spanning tree protocol, which are standardized protocols. These protocols arrange nodes in the network in a tree topology, as their names suggest. These protocols may disable links to prevent loops and provide backup links in the spanning tree in case of node failure.

Another type of topology that may be implemented is a ring topology, which connects nodes in a ring. To prevent loops, a link may be disabled in the ring so packets are not continually forwarded in the ring, which can bring down the network. A protocol that may be used in the ring topology, which prevents loops, is Ethernet Ring Protection Switching (ERPS), which is standardized by the ITU Telecommunication Standardization Sector (ITU-T) under G.8032. Under the G.8032 standard, a node in the ring is selected as a ring protection link (RPL) owner. The RPL owner is responsible for disabling one of the links (i.e., blocking traffic on the link) to prevent a loop in the ring network. The disabled link is called the ring protection link (RPL).

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1A:
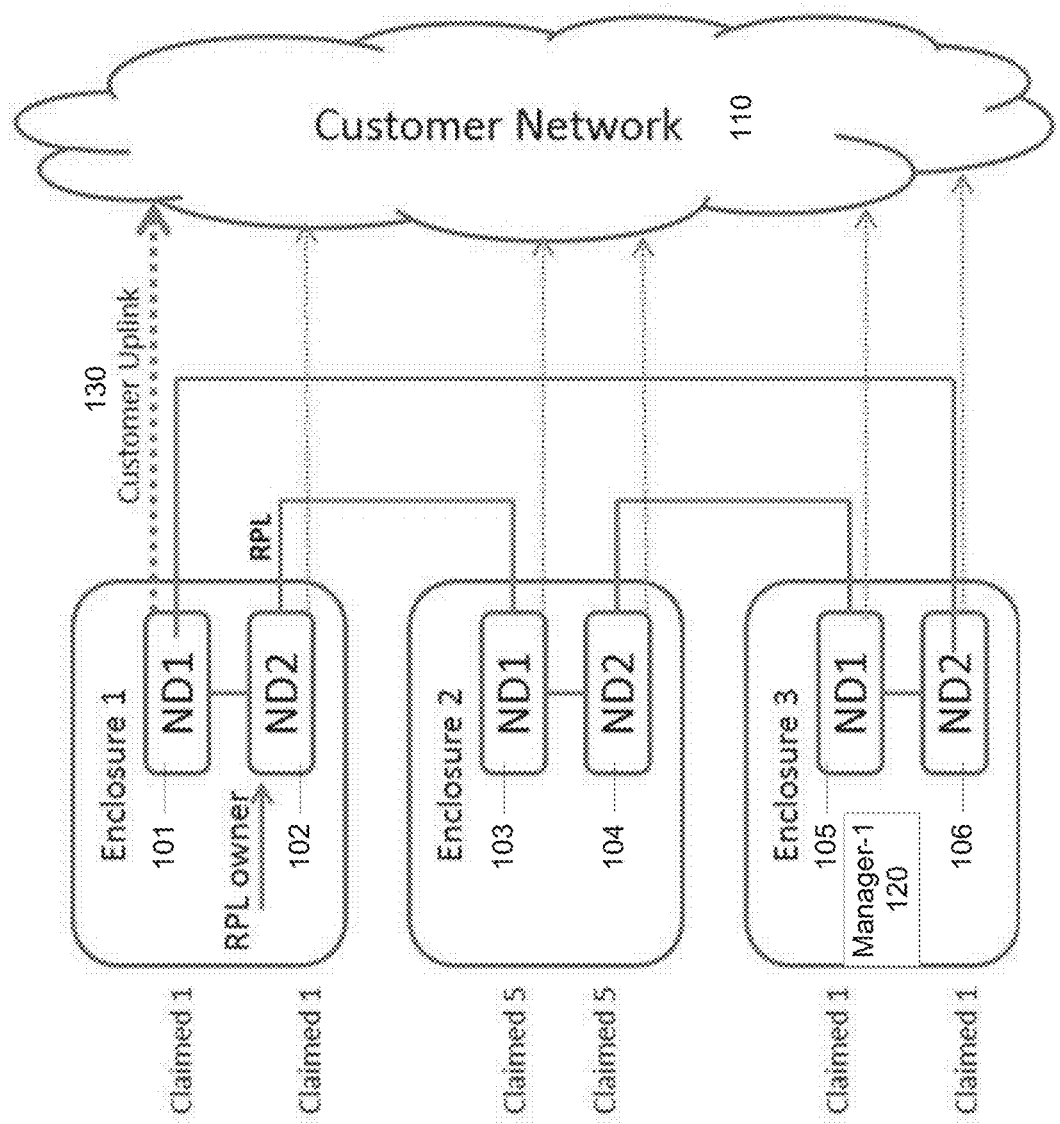
FIGS. 1(a)-(d) illustrate various ring network configurations, according to an example.

Datacenters may include a plurality of servers (e.g., blade servers) and storage devices, or a plurality of enclosures including the servers and storage devices. Communication between the servers and storage devices may be facilitated using network nodes (e.g., switches) connected in a ring network topology. A managing device may manage the network nodes in the ring to provide customer access to the servers and other devices connected to each of the network nodes in the ring network. A network node that is managed by a managing device is referred to as being "claimed" by the managing device. The managing device may be implemented by one of the servers in combination with management software. There may be an additional management device in each ring network designated for redundancy purposes.

Examples disclosed herein facilitate the management of a ring network where network nodes are claimed by different management devices. This may happen, for example, if a network node is added to the ring network with previous management device information still stored in the network node. In an example, a method includes determining that a first network node in a ring network is claimed by a first management device and a second network node in the ring network is claimed by a second management. This may be determined by examining a claimed device identifier in a status message received from the second device with a claimed device identifier associated with the first network node. The claimed device identifier identifies the managing device that has claimed the network node.

The method then includes isolating the second network node from the first network node. As a result of the isolation, the second network node forms a separate linear network. This separate linear network has a link to the same customer network as the first ring network. A reset command may be received at the second network node via this link, which causes the second network node to reset and delete prior ownership information. The second network node may then join the original ring network in an unclaimed status. The second network node may then be claimed by the first management device. In such a manner, the improper condition of having two management devices in a single ring network is able to be resolved in a way that allows the second network node to still become a member of the ring network.

A network node is any computer or device that can communicate in the network, such as via a network link, with another network node. The links may be wired or wireless. An example of a network node is a switch. The switch may be a layer-2 switch and may be an Ethernet switch by way of example. Other types of switches may be used and any device or computer that can connect to two other nodes on the network, such as via two ports, may be a network node. Layer-2 refers to the Data Link Layer of the Open Systems Interconnection Basic Reference Model (the "OSI Model").

An owner node is selected to avoid loops in the ring network. A loop can cause a packet to be repeatedly forwarded around the loop towards a destination. This can cause the network to overload and can cause failure in a short amount of time. A ring network (e.g., a network configured in a ring topology) thus includes an owner node, and the owner node is tasked with executing a procedure to prevent loops. In an example, the owner node blocks traffic on one of its ports that is connected to another node in the ring network via a link. This is also referred to as disabling the link.

In an example, the ring network can execute the G.8032 standard, which is promulgated by the ITU-T for loop prevention, and the owner node is responsible for blocking traffic at one end of a ring protection link (RPL) in the ring network according to the G.8032 standard. To prevent loops, traffic is allowed to flow on all but one of the ring links, and this link is called the RPL in the G.8032 standard. The owner node is connected to one end of the RPL and another node in the ring network is connected to the other end of the RPL, and the owner node is responsible for blocking traffic flow on the RPL, such as by blocking traffic on the RPL. G.8032 is one example of a standard that may be used in the ring network. Other standards or protocols may be used in the ring topology for packet forwarding, loop prevention, etc.

FIGS. 1(a)-(d) illustrate various configurations of a ring network, according to an example. The figures and description refer to linked network devices (NDs) within multiple enclosures (e.g., ND1 and ND2 in Enclosure 1, etc.) as an example of G.8032 owner selection. However, any type of networked modules linked in a linear or ring topology that need to determine an owner in the network may be used. A network device is also referred to herein as a network node.

Each network device (e.g., ND1 101) includes a switch with two link ports. The internal link (I-Link) port links two network devices in an enclosure (e.g., ND1 101 and ND2 102). The external link (E-Link) links a network device in one enclosure to a network device in an adjacent enclosure (e.g., ND2 102 and ND1 103). Each network device also includes a CPU that programs and configures the switch and runs the G.8032 protocol. The G.8032 protocol may be the first protocol to run when the network devices boot so that a G.8032 owner may be determined and network loops may be prevented through the implementation of ring protection links. Each network device may run a daemon that executes the protocol.

As mentioned previously, a managing device is responsible for claiming each of the network devices in the ring. Upon claiming a network device, the managing device becomes the owner for the network device. This prevents other managing devices in other rings from claiming the same network device, which could happen if all rings are connected to the same network switch. When a network device is claimed by a managing device, it saves the IP address of the managing device in persistent storage, such as in a Field Replaceable Unit (FRU). In FIG. 1(a), manager-1 120 is implemented by a server in enclosure 3. Manager-1 120 has claimed the network devices in enclosures 1 and 3. In contrast, as will be explained in more detail later, the network devices in enclosure 2 have been claimed by a different manager—manager-5.

Figure 2:
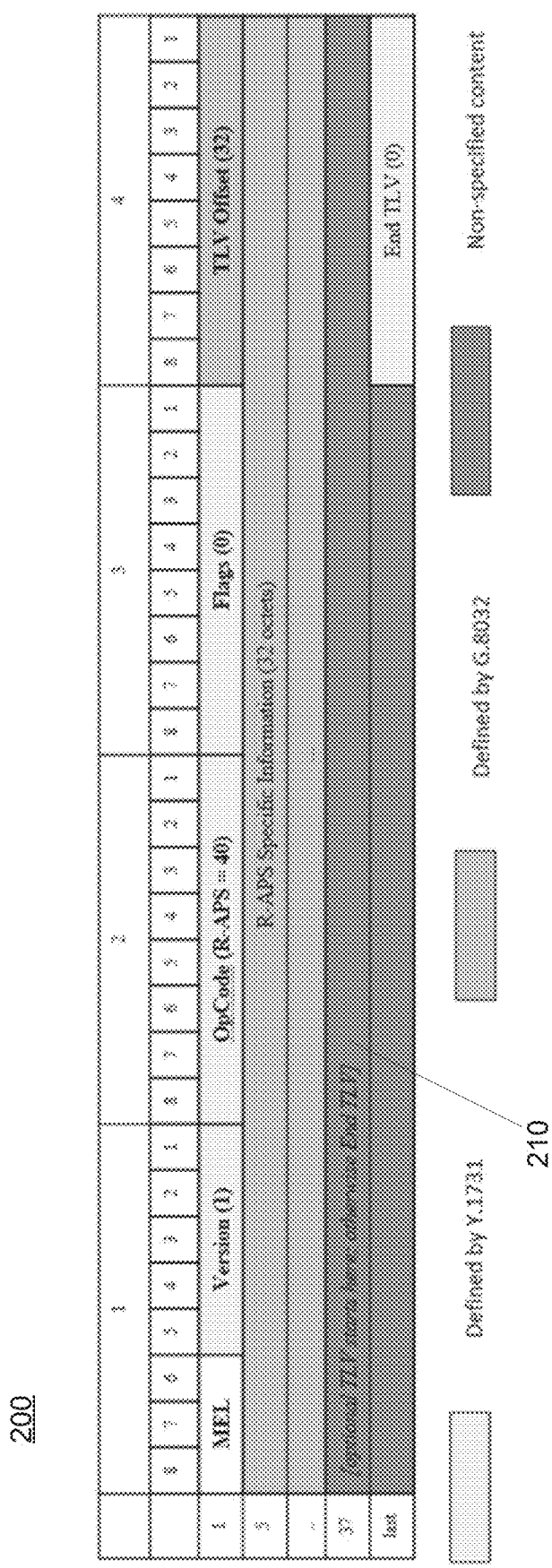
FIG. 2 shows a message format, according to an example.

There may be two types of traffic within the ring network—customer traffic and management traffic. The customer traffic may be, for example, traffic relating to workloads that the servers in the enclosures are performing. In contrast, the management traffic may be traffic related to management of the ring network, such as G.8032 traffic. In particular, each network device (e.g., via it's CPU) transmits and receives G.8032 R-APS messages to/from the link ports. The G.8032 protocol uses R-APS messages to control the state of the ring network and nodes in the network. An example of the R-APS message format is shown in FIG. 2. The customer and management traffic may be separated by virtual local area networks (VLANs). For example, the G.8032 traffic may be sent in VLAN 4095, while customer traffic may be sent in any of VLANs 1 to 4094.

One aspect of the G.8032 protocol includes the daemon of each network device sending point to point status messages to the network devices directly linked to its internal and external ring ports. These messages are referred to as Continuity Check Messages (CCM) and may be formatted according to the Continuity Check Protocol (CCP). These status messages are used to measure the state of the physical link and the health of the G.8032 daemon on the adjacent network devices. Each G.8032 daemon may read a FRU on the network adapter of the network device to retrieve a claimed device identifier. The claimed device identifier identifies the managing device that has claimed the particular network device. Once a network device is claimed, the claimed ID will not change while the network device is in the same G.8032 network.

Sometimes new network devices (or hardware components of a particular network device) will be added to an existing ring network to expand or replace existing network devices. Since these devices and components are new, there will not be a claimed device identifier stored in the FRU of the network adapter. Thus, these network devices and components will be considered unclaimed because the FRU will not have a claimed address.

Sometimes a network device or component of a network device will be replaced with network devices or components that have been used in other network rings. These devices will have a claimed device identifier set in their FRU. However, this claimed device identifier will likely identify a different managing device than the managing device that has claimed the network devices in the new ring that it has been added to. This creates an improper condition in the ring network since all network devices in the ring should be claimed by the same managing device. This is the case in FIG. 1(a), where the network devices in enclosure 2 are indicated by the claimed device identifier as being claimed by manager-5, which is a different managing device than manager-1 (which has claimed the other network devices in the ring). A method for correcting this condition will now be described.

As shown in FIG. 2, the R-APS message format 200 has a TLV field 210 where a user may add additional information. This TLV field 210 may be used to specify a managing device in the ring network that has claimed the particular network device that is generating the R-APS message. The managing device may be specified in this field using the managing device's network address, such as IP address. Specifying the managing device in this way will allow another network device to determine whether it is claimed by a different managing device.

The G.8032 RPL owner periodically sends an R-APS message with the health of the network. In addition, each network device in the ring sends status messages (e.g., CCM packets) out its left and right ports. If a link is broken or disabled in the network, both network devices with a link down will transmit a signal fail condition on the opposite link of the failed link. The G.8032 R-APS Signal Fail (SF) message is sent when either one of the redundant links on a node in the ring is out of service, and is used to notify all nodes in the ring a link went down and notify the owner node to enable the blocked RPL link.

A broken or disabled link may be detected using the status messages (e.g., CCM packets). All network devices in the ring will check each G.8032 message (e.g., CCM packets) received and verify that the network device sending the message has been claimed by the same managing device as it has been claimed by. If the message indicates a different managing device, the message will be dropped. In the case of the CCM messages, this will provoke a signal fail and the customer network traffic will be disabled (e.g., by disabling the customer network traffic group of VLANs for regular (i.e., non-management) traffic). The network device then will begin to send signal fail conditions out the other link. The group of network devices then becomes a logical linear network, even though all cables are connected. This action will isolate a network device from the regular ring. However, the management traffic link is still enabled (e.g., the VLAN that G.8032 uses for management traffic is still enabled). This is done so that once the isolated network devices have been reset (as described below), the traffic those devices send will provoke enabling the network ports. This will enable the managing device for the ring network to claim the device or devices.

When a network device is isolated from the ring, the managing device for the ring will not be able to send traffic to the isolated network device because the customer traffic links have been disabled. As a result, the network device (or devices) that have been isolated will form its own G.8032 network with a new G.8032 RPL owner. This allows any one of the isolated network devices to enable its link to the customer network. By enabling a link to the customer network, the network device(s) is able to receive commands from the customer network, such as a reset command. In particular, the network device may receive a factory reset command from the customer network. Alternatively, a reset command may be issued to the network device by pressing a hardware button on the device. Upon executing the factory reset operation, the network device is restored to a default configuration/setting and is rebooted. In particular, any claimed device identifier stored in the network device (e.g., stored in an FRU of the network device) will be erased. Once the network devices has been reset and rebooted, it will have an unclaimed status since it will not have a claimed device identifier. The network device can then join the ring network (which is automatic since the management traffic link is still enabled). The previously enabled second customer uplink will also be disabled. Upon joining the ring network in an unclaimed status, the managing device for the ring network may claim the network device. The network device will then identify the managing device via the claimed device identifier. The network device will then be claimed by the same managing device as the other network devices in the ring.

FIGS. 1(a)-(d) will now be used to illustrate an example of the description above. FIGS. 1(a)-(d) illustrate a ring network with three enclosures. Each enclosure has two network devices. Each network device has a link to the customer network 110 and has a right and left link to adjacent network devices. In FIG. 1(a), only the customer network link of ND1 101 is enabled (customer uplink 130), since only a single customer uplink may be enabled in a ring network so as to avoid the formation of a loop. Additionally, ND2 102 of enclosure 1 acts as the RPL owner and disables the link between itself and ND1 103 of enclosure 2 so as to prevent the formation of a loop. Each enclosure may include additional devices, such as servers and storage devices. A server in enclosure 3 executes management software and acts as a managing device (manager-1 120) for the ring network.

In FIG. 1(a), the network devices in enclosure 1 and 3 are claimed by manager-1 120. This may be indicated by storing the network address of manager-1 120 in a storage (e.g., FRU) of these network devices. This value is referred to as the "claimed device identifier". In contrast, the network devices in enclosure 2 are indicated as being claimed by a different managing device—manager-5. Again, this may be indicated via the network address of manager-5 being stored in a storage of the network devices of enclosure 2.

ND2 102 and ND1 103 will recognize that each is sending status messages (e.g., CCM messages) with different claimed device identifiers. As a result, ND2 102 and ND1 103 will disable the link port for customer traffic between each other, and the ring network will enter a signal fail condition. The same process occurs between ND2 104 in enclosure 2 and ND1 105 in enclosure 3.

Figure 1B:
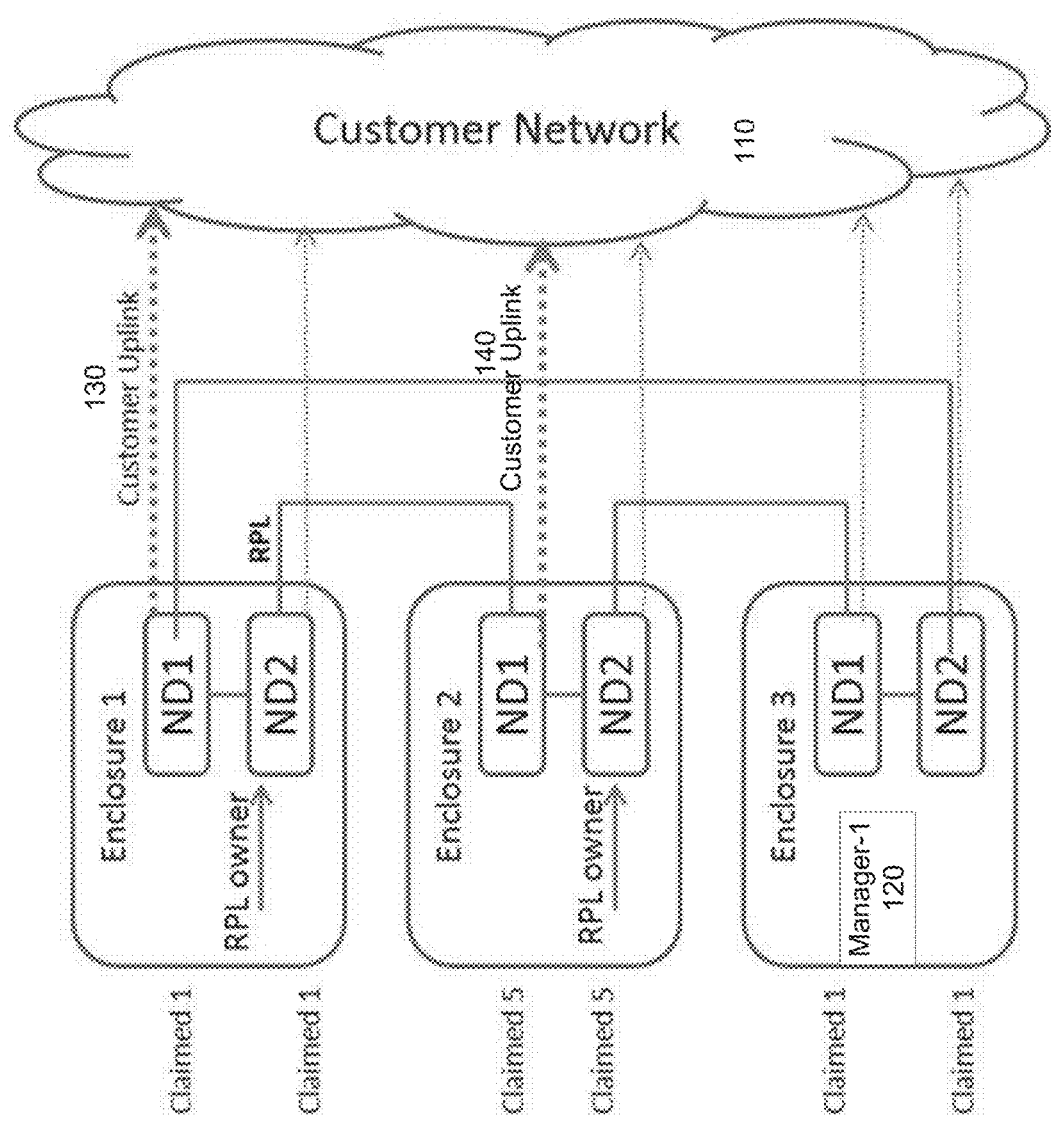

As a result, the network devices in enclosure 2 will be isolated from the network devices in enclosures 1 and 3. Management traffic will still be sent on the management VLAN, but the customer traffic links will be disabled. The network devices of enclosure 2 will then form a new network—a G.8032 linear network—with an RPL owner of its own—ND2 of enclosure 2. This is shown in FIG. 1(b). There is now a ring network including the network devices of all three enclosures (though with limited functionality), and two linear networks (one linear network including the network devices of enclosures 1 and 3 and a second linear network including the network devices of enclosure 2). Since the two linear networks are isolated, a customer uplink 140 is enabled for the linear network of enclosure 2. There will not be a network loop between the two customer enabled uplinks 130, 140 because the customer traffic is isolated across the link ports between the enclosures.

Figure 1C:
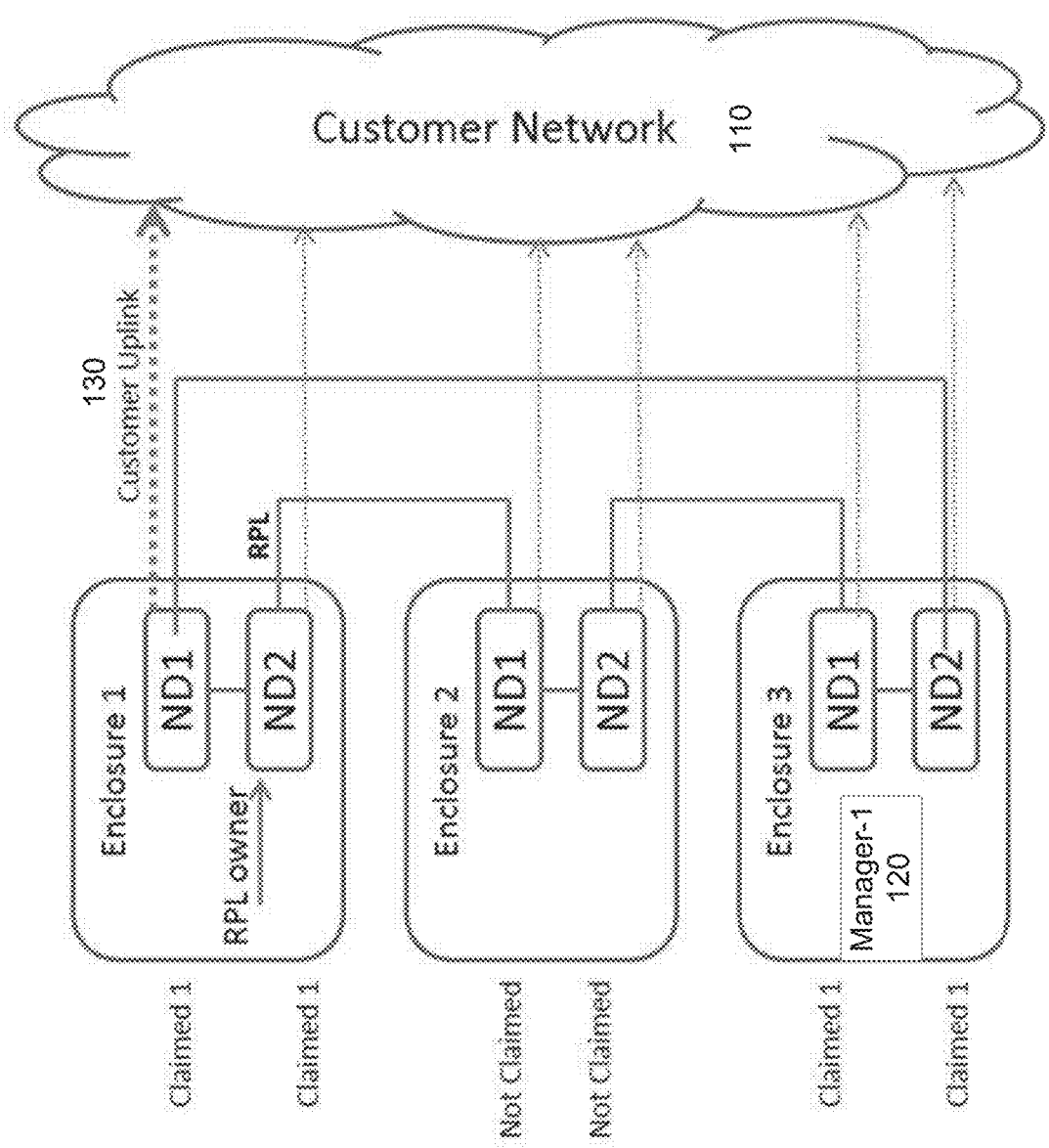

The customer uplink enabled in enclosure 2 provides customer network access to the network devices in that enclosure. Thus, a reset command, such as for a factory reset operation, may be sent to the network devices of enclosure 2. Upon executing the factory reset operation, the claimed device identifier in each reset network device is deleted and the reset network devices are rebooted. Upon powering up, the customer uplink 140 is disabled, ND2 of enclosure 2 will no longer be an RPL owner, and there will not be separate linear networks within the ring network. The network devices of enclosure 2 will then rejoin the ring network (by virtue of the physical link connections to the network devices of enclosures 1 and 3). As shown in FIG. 1(c), the network devices of enclosure 2 will rejoin the network in an unclaimed status.

Figure 1D:
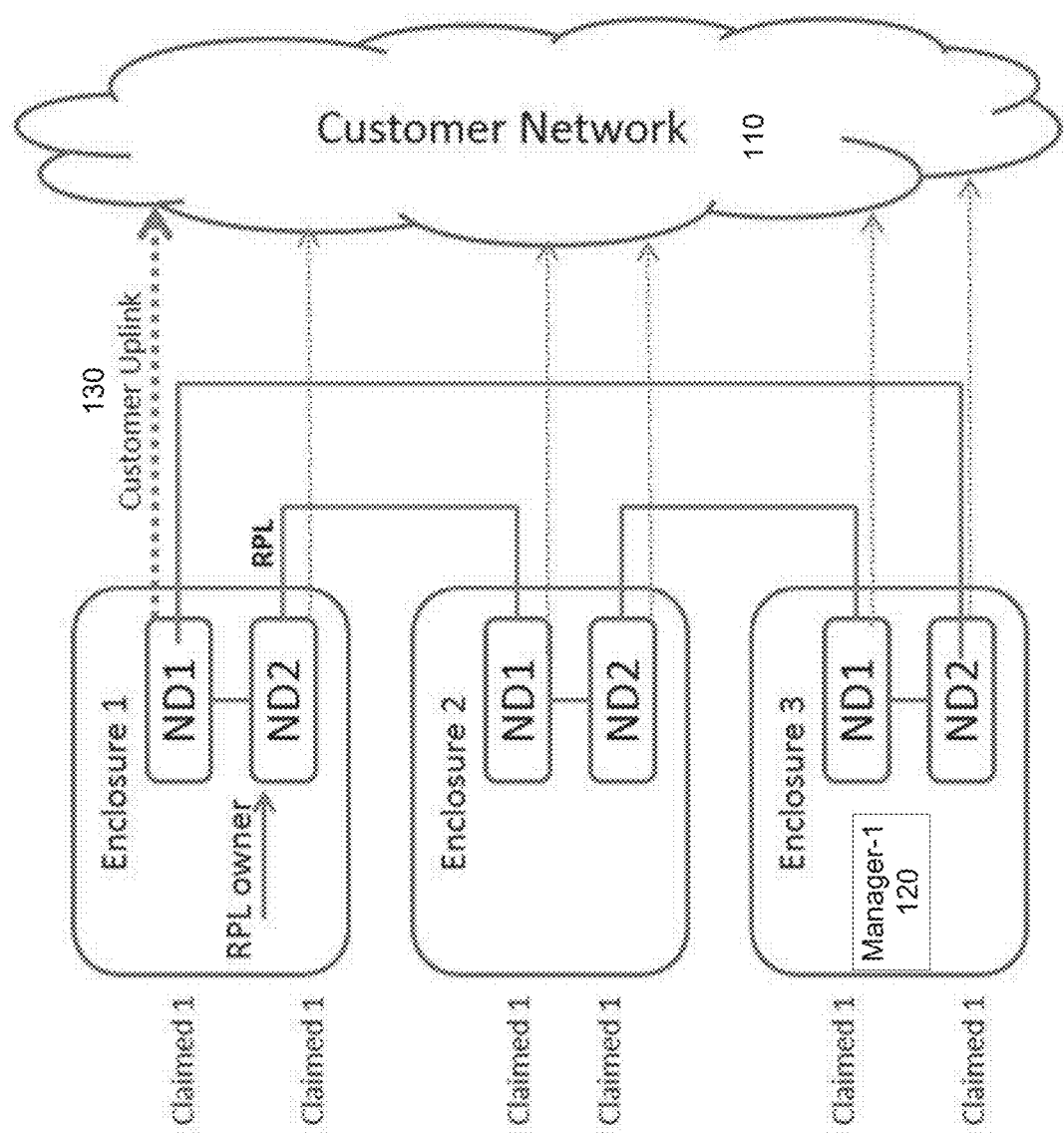

Because the network devices are in an unclaimed status, manager-1 120 may claim them. The newly claimed network devices may then store the network address of manager-1 120 as the claimed device identifier. As a result, as shown in FIG. 1(d), the ring network will have all network devices claimed by the same managing device. Accordingly, the improper condition of having network devices in a ring network claimed by different managing devices has been rectified.

Figure 3:
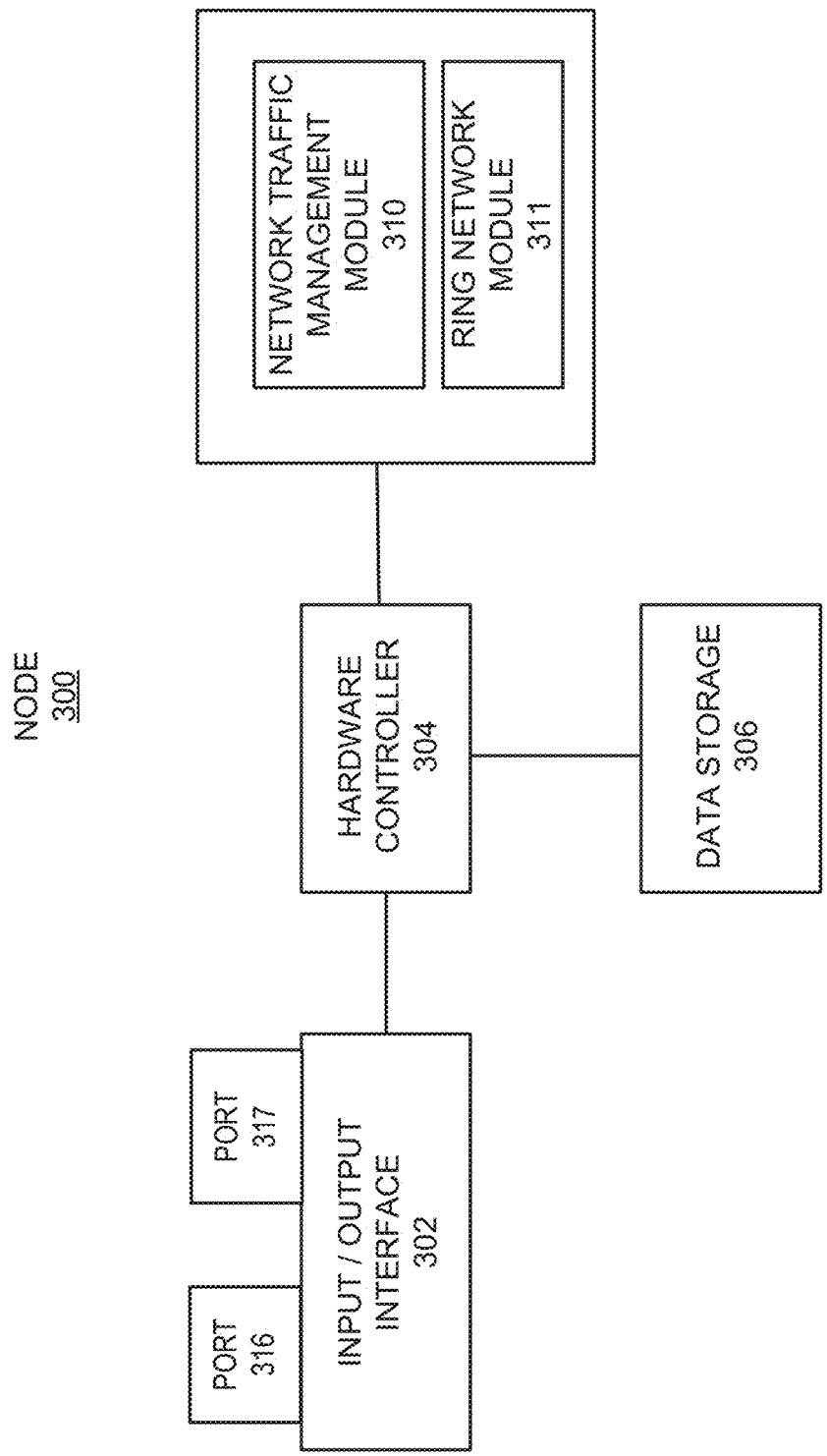
FIG. 3 illustrates a network node, according to an example.

FIG. 3 illustrates an example of a network node in the networks shown in FIGS. 1(a)-(d). In an example, the node is a network switch. As shown in FIG. 3, the node 300 includes a hardware controller 304, an input/output interface 302, a data storage 306 and modules 310 and 311. The controller 304 may include a microprocessor operable to execute machine readable instructions to perform programmed functions and/or hardware dedicated to perform one or more particular functions, such as an application specific integrated circuit (ASIC), field-programmable gate array (FPGA), or other customized integrated circuit.

The data storage 306 may include volatile and/or non-volatile data storage, such as random access memory, memristors, flash memory, and the like. Machine readable instructions, tables, packet forwarding rules, and any information used by the node 300 may be stored on the data storage 306. Other known electronic components may be added or substituted.

The input/output interface 302 may include hardware and/or software to enable the controller 304 to communicate with nodes through ports 316 and 317. The input/output interface 302 may include a network interface card. The ports 316 and 317 may be Ethernet ports. The node 300 may have more than two ports, for example, to connect to other computer systems, which may include servers and storage devices.

The module 310 may be for network traffic management, such as packet forwarding based on a routing table and packet forwarding rules. The module 310 may execute a ring network protocol. The module 311 may be a ring network module that implements methods and functions described herein. The modules 310 and 311 may be implemented by the controller 304. The modules 310 and 311 may include hardware customized to perform the functions of the modules and/or may include machine readable instructions stored on a non-transitory computer readable medium (e.g., data storage 306) such as volatile or non-volatile memory or other type of data storage, and executed by the processor 304. In an example, the node may be connected to an external processor that can execute one or more of the functions of the modules 310 and 311.

Figure 4:
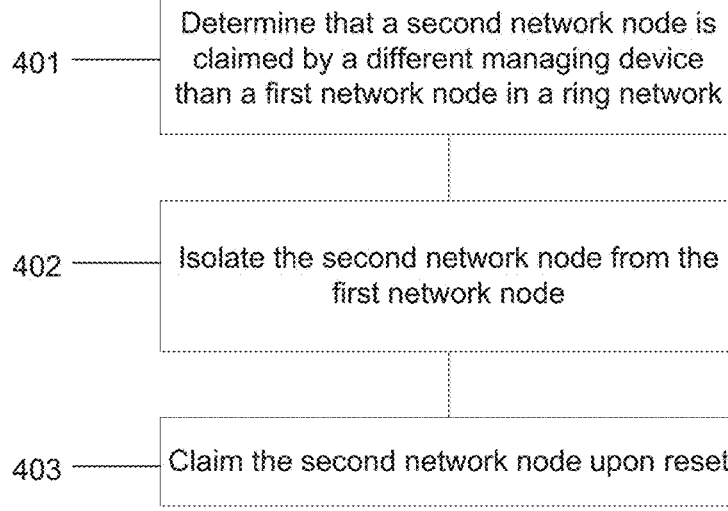
FIGS. 4 and 5 illustrate methods of operation in a ring network, according to an example.
Figure 5:
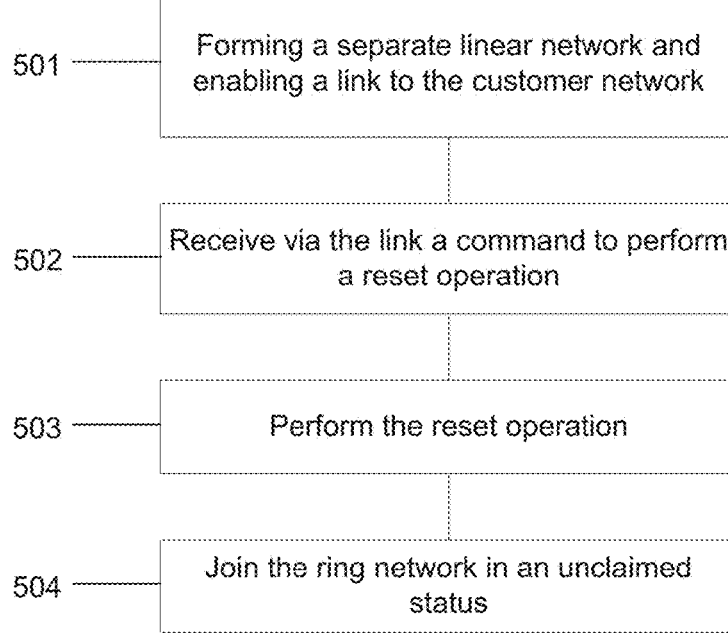

Flowcharts representative of example machine readable instructions for implementing the ring network module 311 of FIG. 3 are shown in FIGS. 4 and 5. In this example, the machine readable instructions comprise a program/process for execution by a processor, such as hardware controller 304. The program(s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the hardware controller 304, such as data storage 306. The entire program/process and/or parts thereof could alternatively be executed by a device other than the hardware controller 304 and/or may be embodied in firmware or dedicated hardware. Further, although the example program(s)/process(es) is/are described with reference to the flowcharts illustrated in FIGS. 4 and 5, many other methods of implementing the example ring network module 300 may alternatively be used. For example, the order of execution of the blocks may be changed, and/or some of the blocks described may be changed, eliminated, or combined.

The example process 400 of FIG. 4 begins with an initiation of the ring network module 300 (e.g., upon startup, upon instructions from a user, upon startup of a device implementing the ring network module 300 (e.g., an enclosure processor), etc.). The process 400 may be executed to correct an improper condition of network devices in a ring network being claimed by different managing devices. At 401, it may be determined whether a second network node is claimed by a different managing device than a first network node in the ring network. This may be determined by comparing a claimed device identifier stored in a status message received from the second network device to a claimed device identifier associated with the first network device (e.g., stored in an FRU of the first network device).

At 402, the second network node may be isolated from the first network node. This may be done in response to determining that the second network node is claimed by a different managing device. For example, upon making that determination, the status message received from the second network device may be dropped by the first network device, which may provoke the second network device being isolated from the first network device through the sending of signal fail messages. At 403, upon reset of the second network device, the second network device may be claimed by the managing device of the ring network.

Process 500 relates to actions that can take place after the second network device is isolated from the first network device. At 501, a separate linear network may be formed in response to the second network device being isolated. The separate linear network may include the second network device and may potentially include other network devices that are similarly isolated. The separate linear network may have a separate link to the customer network enabled. The separate linear network may also have a separate RPL owner that is different than the RPL owner of the first ring network.

At 502, the second network device may receive a command to perform a reset operation. The command may be received from the customer network via the link to the customer network. The command may be to execute a factory reset operation. At 503, the second network device may execute the reset operation. The reset operation may power down the network device and restore it to a default configuration. As part of this, any prior claimed device identifier stored in the second network device (e.g., in an FRU of the second network device) may be deleted. At 504, the second network device may power back up and rejoin the first ring network. Because the prior claimed device identifier has been deleted, the second network device may join the first ring network in an unclaimed status. Upon joining the first ring network in an unclaimed status, the managing device that has claimed the other network devices in the first ring network may then claim the second network device. Accordingly, the improper condition of having network devices in a ring network claimed by different managing devices is thus rectified.

As mentioned above, the example processes 400, 500 of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    determining, by a first network node in a ring network, that the first network node is managed by a first managing device and a second and a third network nodes in the ring network are managed by a second managing device, wherein the ring network has a first link to a customer network, and wherein the second managing device is configured to manage the ring network;

in response to the determination, isolating the first network node from the ring network by disabling, by the first network node, flow of data traffic between the first network node, and the second and third network nodes;

forming a separate second link to the customer network in response to the isolation wherein the first and second links are not part of the ring network; and resetting the first network node to remove association with the first managing device; and joining the ring network under management of the second managing device.

2. The method of claim 1, wherein joining the ring network under management of the second managing device comprises sending a status message comprising a claimed device identifier associated with the first network node.

3. The method of claim 1, further comprising:
in response to determining that the second network node is managed by the first managing device, dropping a status message from the second network node.

4. The method of claim 3, further comprising initiating the isolation of the first network node in response to dropping the status message.

5. The method of claim 3, wherein the status message is a Continuity Check Message (CCM) of an Ethernet Ring Protection Switching (ERPS) protocol.

6. The method of claim 1, wherein isolating the first network node comprises maintaining exchange of management traffic between the first network node, and the second and third network nodes.

7. The method of claim 6, wherein the first network node joins the ring network under management of the second managing device based on the management traffic between the first network node, and the second and third network nodes.

8. The method of claim 1, wherein resetting the first network node comprises receiving a reset command via the second link to the customer network.

9. The method of claim 1,
wherein resetting the first network node comprises deleting a claimed device identifier corresponding to the first managing device.

10. The method of claim 1, further comprising comparing a first claimed device identifier of the first network node with a second claimed device identifier of a second network node, wherein the first and second claimed device identifiers correspond to the first and second managing devices, respectively.

11. A first network node in a ring network, comprising a hardware controller configured to:
determine that the first network node is managed by a first managing device, and a second and a third network nodes in the ring network are managed by a second managing device, wherein the ring network has a first link to a customer network, and wherein the second managing device is configured to manage the ring network;

in response to the determination, isolate the first network node from the ring network by disabling, by the first network node, flow of data traffic between the first network node, and the second and third network nodes; and form a separate second link to the customer network in response to the isolation, wherein the first and second links are not part of the ring network; and a ring module configured to:
reset the first network node to remove association with the first managing device; and
join the ring network under management of the second managing device.

12. The first network node of claim 11, wherein joining the ring network under management of the second managing device comprises sending a status message comprising a claimed device identifier associated with the first network node.

13. The first network node of claim 12, wherein the status message is a Continuity Check Message (CCM) of an Ethernet Ring Protection Switching (ERPS) protocol.

14. The first network node of claim 11, wherein the hardware controller is further configured to maintain exchange of management traffic between the first network node, and the second and third network nodes.

15. The first network node of claim 11, wherein the ring module is further configured to reset the first network node in response to receiving a reset command via the second link to the customer network.

16. A non-transitory machine readable storage medium comprising instructions that when executed cause a computer to:
determine, by a first network node in a ring network, that the first network node is managed by a first managing device, and a second and a third network nodes in the ring network are managed by a second managing device, wherein the ring network has a first link to a customer network and a single ring protection link owner, and wherein the second managing device is configured to manage the ring network;

in response to the determination, isolate the first network node from the ring network by disabling, by the first network node, flow of data traffic between the first network node, and the second and third network nodes;

form a separate second link to the customer network in response to the isolation, wherein the first and second links are not part of the ring network, reset the first network node to remove association with the first managing device; and join the ring network under management of the second managing device.

17. The non-transitory machine readable storage medium of claim 16, wherein isolating the first network node from the first network node comprises:
maintaining exchange of management traffic between the first network node, and the second and third network nodes.

18. The non-transitory machine readable storage medium of claim 16,
wherein resetting the first network node comprises deleting a claimed device identifier corresponding to the first managing device.

19. The non-transitory machine readable storage medium of claim 16, wherein isolating the first network node comprises maintaining exchange of management traffic between the first network node, and the second and third network nodes.

20. The non-transitory machine readable storage medium of claim 16, wherein resetting the first network node comprises receiving a reset command via the second link to the customer network.

* * * * *